Aug. 26, 1924.　　　　　　　　　　　　　　　　　　1,505,995
A. B. CADMAN
DUMPING VEHICLE
Filed Aug. 23, 1920　　　　5 Sheets-Sheet 1
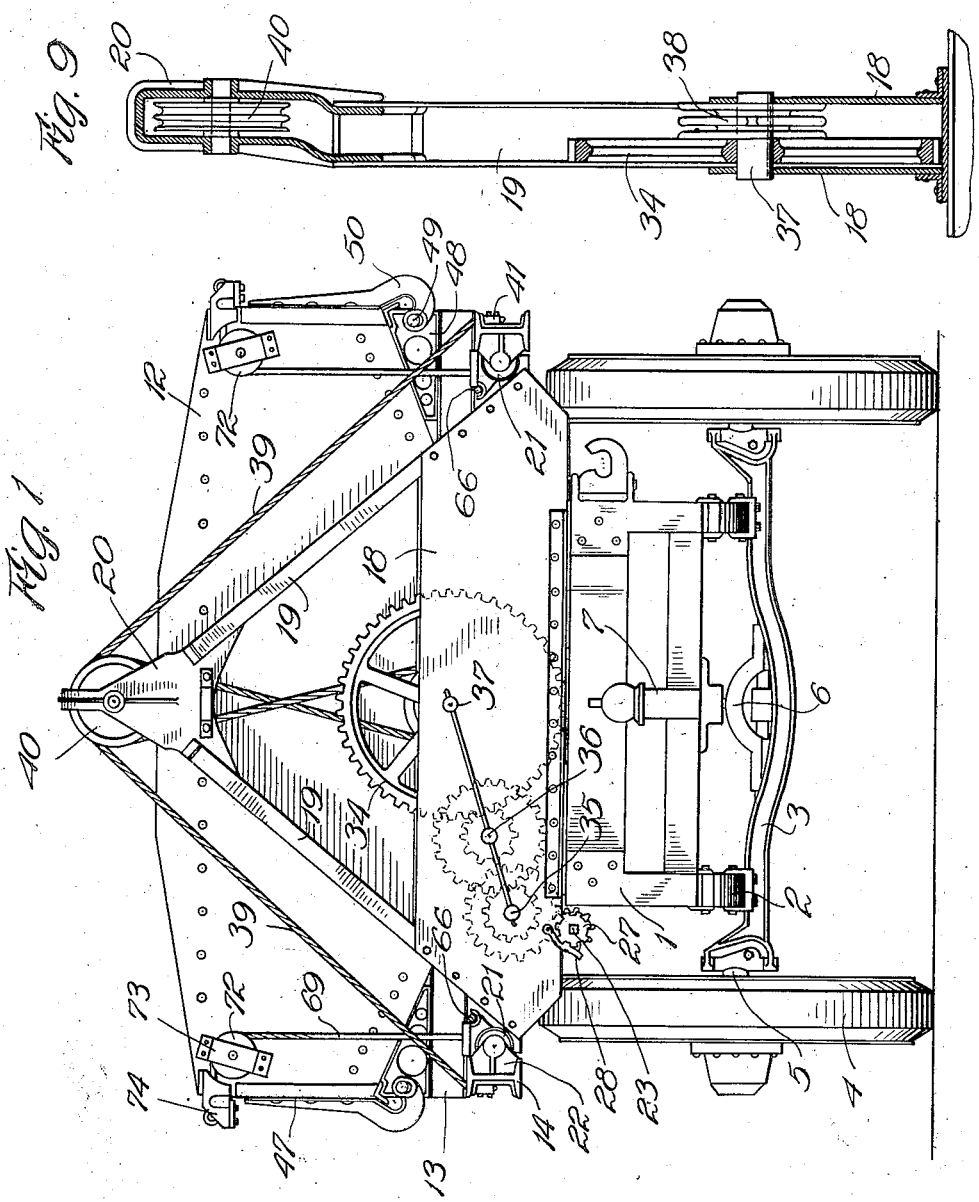
Inventor
Addi Benjamin Cadman
By Miller Chindahl & Parker
Attys

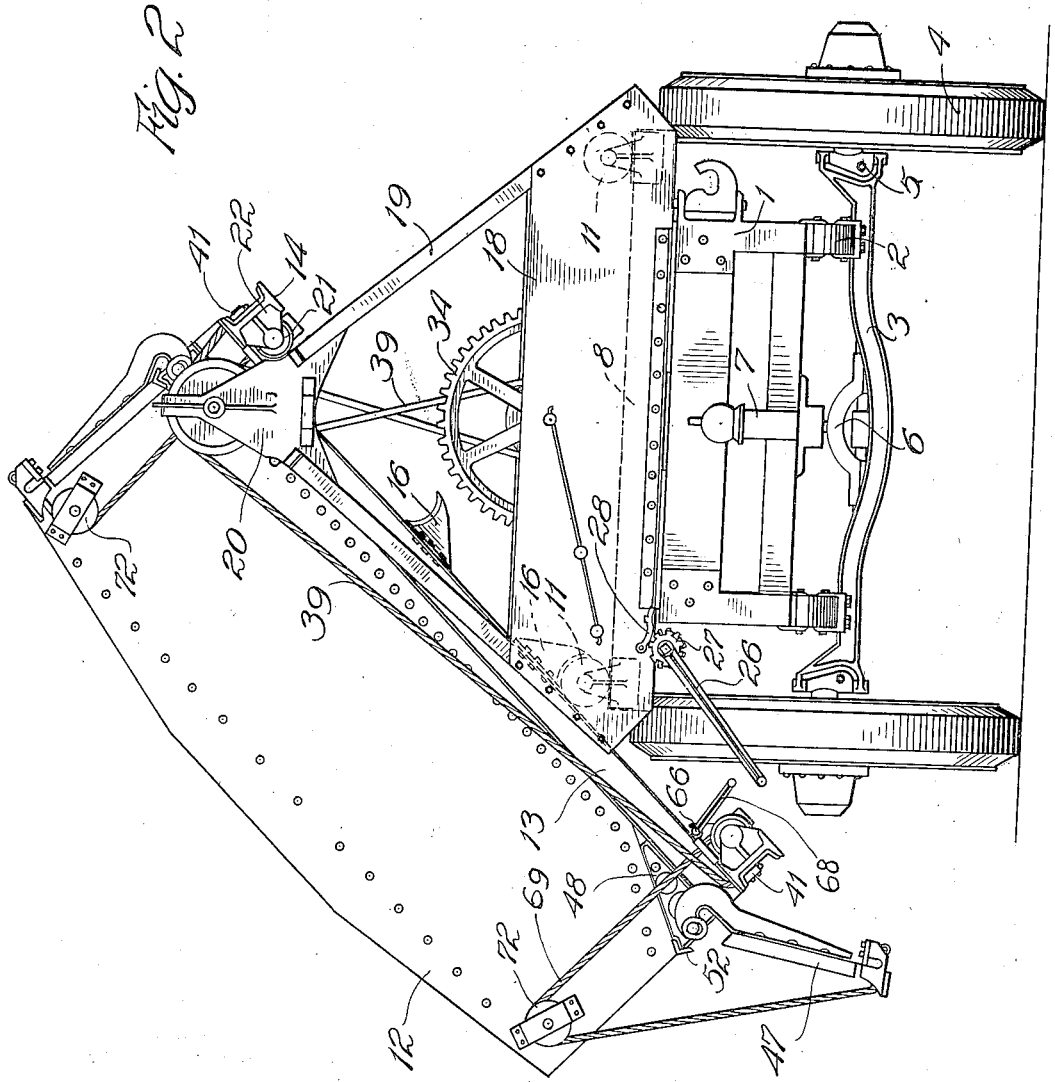

Aug. 26, 1924.
A. B. CADMAN
1,505,995
DUMPING VEHICLE
Filed Aug. 23, 1920    5 Sheets-Sheet 3
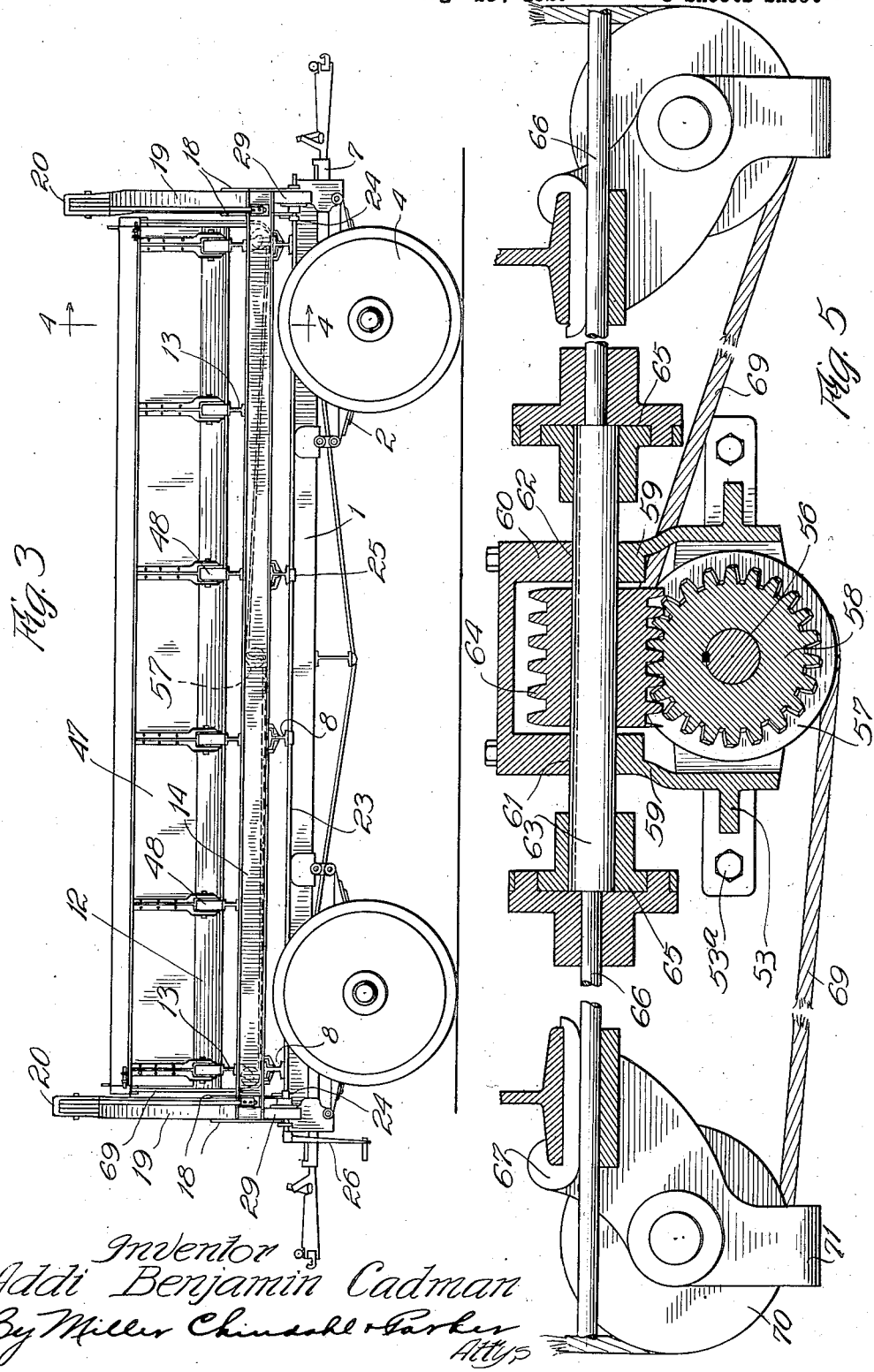
Inventor
Addi Benjamin Cadman

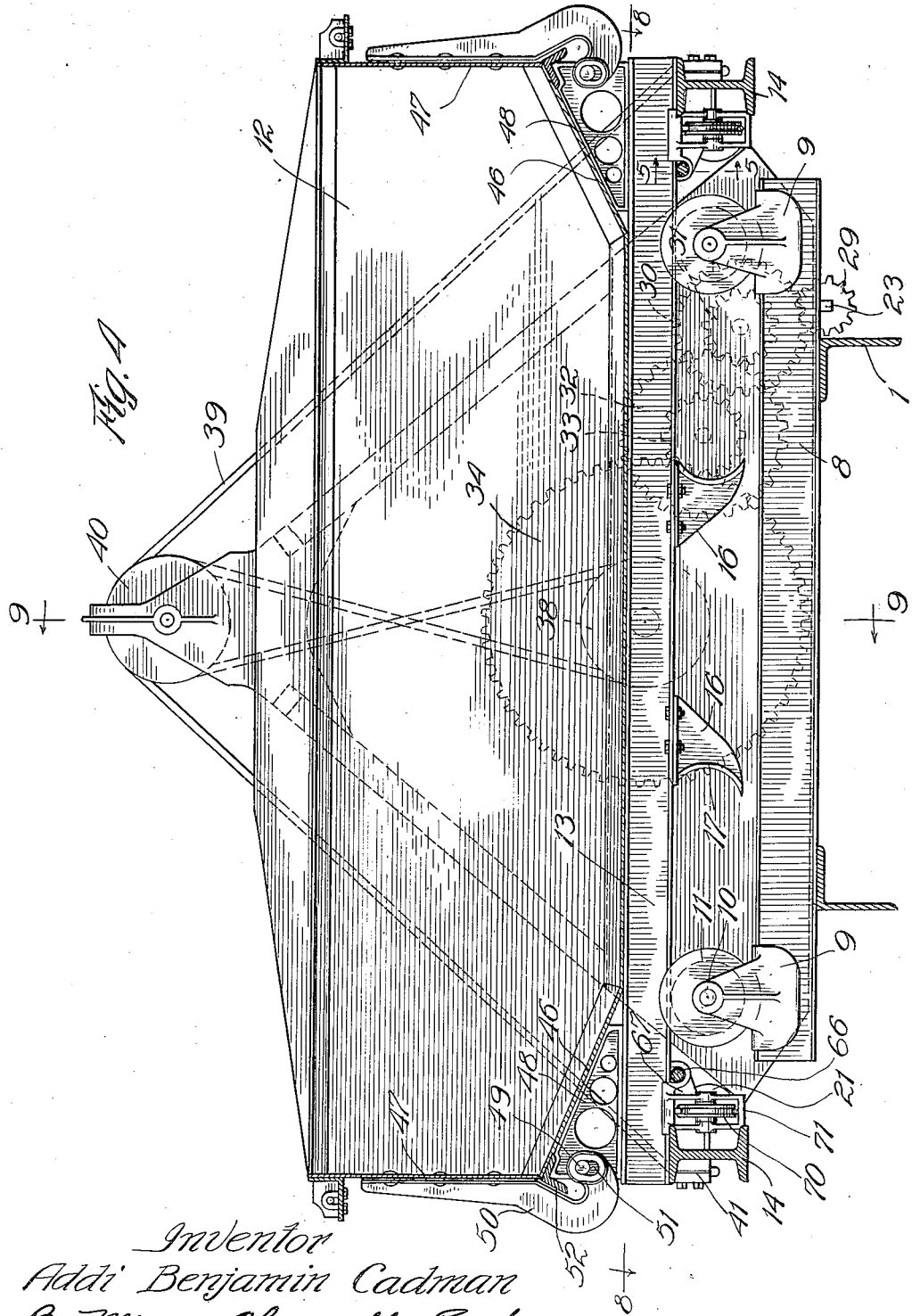

Aug. 26, 1924.
A. B. CADMAN
DUMPING VEHICLE
Filed Aug. 23, 1920
1,505,995
5 Sheets-Sheet 5
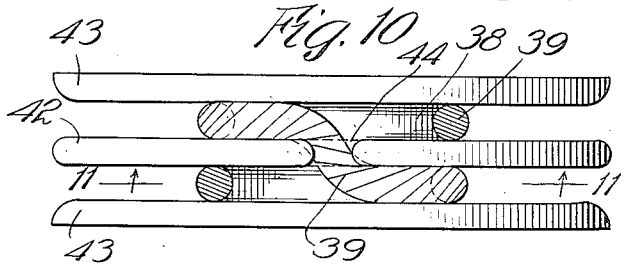
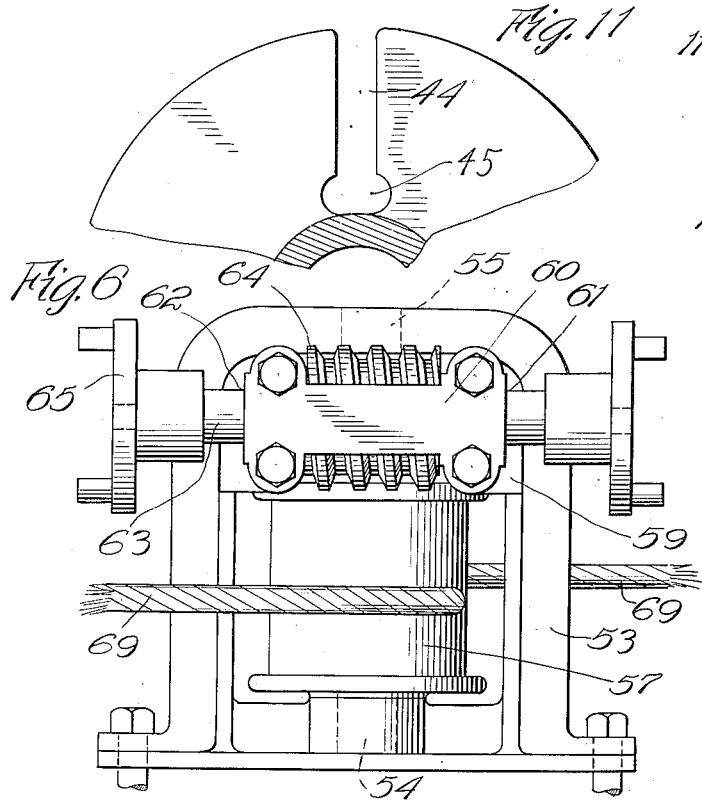
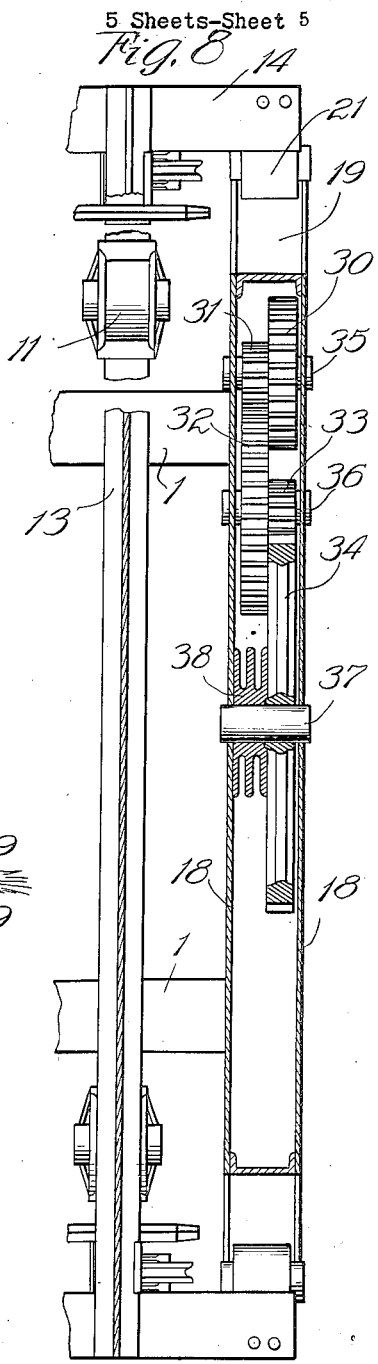
Inventor
Addi Benjamin Cadman
By Miller Chindahl & Farber
Attys Patented Aug. 26, 1924.

1,505,995

UNITED STATES PATENT OFFICE.

ADDI BENJAMIN CADMAN, OF BELOIT, WISCONSIN, ASSIGNOR TO WARNER MANUFACTURING COMPANY, A CORPORATION OF WISCONSIN.

DUMPING VEHICLE.

Application filed August 23, 1920. Serial No. 405,216.

*To all whom it may concern:*

Be it known that I, ADDI BENJAMIN CADMAN, a citizen of the United States, residing at Beloit, in the county of Rock and State of Wisconsin, have invented certain new and useful Improvements in Dumping Vehicles, of which the following is a specification.

My invention relates to dump trucks, and more especially to the dirigible type used as trailers in connection with an independent tractor unit.

Being unequipped with locomotive power adaptable to drive unloading mechanism, trailer dump trucks are commonly constructed to discharge their loads by means of manually operated dumping devices, in which ease of operation and ample power with positive control are important features.

An object of this invention is to provide a side dump truck of improved construction having a body with drop sides and so supported on the truck frame that a load may be dumped at either side by elevating the opposite side and simultaneously shifting the body in the direction of discharge to deposit the load clear of the wheels.

Another object of the invention is to provide new and improved operating means in a truck of this character giving positive and easy manual control of the dumping operation to secure more efficient and economical service.

With the objects in view thus generally stated and with other objects which will be apparent in the following description, the invention comprises the novel features of construction, arrangement and combination of parts hereinafter described and claimed, and shown in the drawings wherein:

Figure 1 is an end view of the truck, showing the body in level position with sides closed.

Fig. 2 is an end view showing the body elevated on one side and shifted laterally with the lower side opened, in dumping position.

Fig. 3 is a side view of the truck with the body positioned as in Fig. 1.

Fig. 4 represents a vertical cross section of the body and its supporting frame taken on the line 4—4 of Fig. 3.

Fig. 5 is a broken sectional detail view of the operating means for opening and closing the sides of the body taken on the longitudinal plane of the line 5—5 in Fig. 4.

Fig. 6 is a detail plan view of the worm-driven cable drum and its support as illustrated in the central broken section of Fig. 5.

Fig. 7 is a vertical section through the center of the drum cylinder indicating my construction for the attachment of a cable.

Fig. 8 is a cross sectional view of one end of the truck frame and body tilting mechanism taken on the horizontal plane of the line 8—8 in Fig. 4, and including a cross sill and end portions of the body frame.

Fig. 9 is a vertical sectional view of one of the upright end members of the truck frame taken in the plane of the line 9—9 in Fig. 4 and showing parts of the body tilting means.

Fig. 10 is a detail view of the double driving drum indicated in Figs. 8 and 9 and illustrating the construction of the cable ways.

Fig. 11 is a partial cross section taken in the plane of the line 11—11 in Fig. 10.

Referring to Figs. 1, 2 and 3, a truck frame 1 is supported upon springs 2 carried by axles 3. Wheels 4 mounted on swivelled stub axles 5 have steering connections 6 with a pivoted draw bar 7 mounted one at each end of the truck frame and adapted to be connected with a tractor vehicle whereby the trailer truck is drawn and steered.

Referring to Figs. 3 and 4, cross members 8 are mounted on the frame 1, extending a substantial distance beyond the side members of the frame and suitably spaced thereon to support a body and its load contents. Roller brackets 9 are fixed upon the cross members, one at each end of each member, and have bifurcated arms extending upwardly to receive bearing pins 10 positioned transversely of the cross members. A roller 11 is journaled upon the pin 10 between the bracket arms, each roller having a concentric channel formed in its outer periphery.

A dump body 12 is mounted above the truck frame upon cross beams 13 secured to its bottom and suitably spaced so that one beam is positioned directly over each pair of rollers and resting within the channels formed in the rollers. The beams 13 extend a substantial distance outside of the rollers on each side of the frame and are connected together beneath their outer ends on each side by tie beams 14. On the underside of each of the cross beams which engage the rollers 11 are fixed a pair of roller stops 16. The stops are positioned between and spaced from the rollers, and each has an arcuate recess 17 facing the adjacent roller.

By this construction it will be seen that the body may be rolled laterally in either direction, its movement being limited by contact between the rollers 11 and stops 16. By means hereinafter described, one side of the body may be lifted and at the same time the body is shifted in the direction of the opposite side, bearing upon the rollers on the latter side in such sliding movement. Upon contact between the rollers and the stops 16, the sliding fulcrum of the frame members in the tilting movement of the body becomes established at that point, and the dumping movement of the body is completed as upon pivoted bearings comprising the rollers 11. The stops 16 are so located that when in contact with the rollers on one side, that side of the body considerably overreaches the wheels of the truck. It will thus be apparent that in dumping the contents of the body, its lower side is carried downward and well outside of the running gear so that the load is deposited free of the wheels and may be directed into a bin or chute alongside or piled without the roadway.

At each end of the truck frame is provided a structure for guiding the body in the dumping movement just described. Fixed transversely upon the truck frame at each end are a pair of spaced plates 18 (Figs. 2 and 8) extending uprightly alongside the ends of the body 12. Secured between the ends of each pair of plates are two inclined members 19, their upper ends converging and supporting a hoist sheave housing 20. The members 18, 19 and 20 form a substantially triangular structure of which the inclined outer surfaces of the members 19 constitute guiding supports simulating a cam for control of the lateral movement of the body in dumping. That control is accomplished by means of cam rollers 21 pivoted in brackets 22 fixed upon longitudinal extensions of the body frame tie beams 14 at each side of the frame and at opposite ends thereof. When either side of the body is lifted, as hereinafter described, the cam rollers 21 on the side of the body which is raised bear on the outer surfaces of the members 19 and course its inclined length permitting the gradual lateral movement of the body until the stops 16 engage the rollers 11, thus preventing any destructive impact of the moving parts in the dumping operation. It will be seen, also that with the body at rest in horizontal position, the cam rollers 21 are in engagement with the members 19 at both ends of the truck, thereby stabilizing the position of the body upon the truck frame in transportation and preventing side play of the body upon its roller under-support.

To actuate the body in the dumping operation mechanism is provided at each end of the truck frame, which is interconnected to be operated as a unit. Running longitudinally at one side of the truck frame is an operating rod 23 rotatably supported at each end by suitable journal brackets 24 (Fig. 3) mounted upon the under sides of the plates 18, and having suitable intermediate support upon the truck frame as at 25. A detachable hand crank 26 is provided for operable attachment at either end of the rod 23. A ratchet wheel 27 (Fig. 2) fixed upon each end of the operating rod and coacting with a dog 28 pivoted on the outer plate 18 enables the operator to inoperatively secure the rod 23 as may be desired.

Positioned between the plates 18 at each end of the truck and fixed upon the operating rod 23 is a pinion 29 (Figs. 4 and 8) by which is actuated a train of gear wheels and pinions 30 and 31, 32 and 33, and 34 (designated respectively in the order of their engagement) mounted between the plates 18 and having their pivotal bearings upon stub shafts 35, 36 and 37 respectively journaled in the plates 18. Mounted upon the shaft 37 and in fixed relation to the gear 34 is a two way cable drum 38, upon which is wound a single cable 39. The two ends of the cable lead over a double sheave 40 pivoted in the housing 20, and downward on opposite sides to the extended ends of the body frame tie beams 14, to which the cable ends are secured by suitable clamps 41. Referring to Figs. 10 and 11, the cable drum 38 is constructed with a central partition member 42 forming two cable ways between the outer flanges 43. A radial slot 44 having an enlargement 45 at its base is formed in the member 42. The single cable 39 is passed through the slot and wound in opposite directions about the drum in the separate cable ways. The shoulders of the enlargement 45 secure the cable in place. The advantage will be apparent in thus positively securing the cable in a manner quickly detachable, and providing for its double and reverse winding on the drum.

To perform the dumping operation an operator attaches the crank handle 26 at either end of the rod 23 and rotates the latter in one or the other direction as determined by the side toward which it is desired to dump the load, whereupon the cable drum is actuated through the gear train to wind one side of the cable and unwind the other, thus raising one side of the truck and allowing the body to slide gradually outward and downward on the other side. It will now be apparent that the construction described provides for positive control and easy operation in dumping the body of its load. The body is lifted and shifted into its dumping position gradually and smoothly, and is positively controlled throughout the range of its movement. It is returned to normal position in the same manner by reversing the crank motion. Ample power is provided in the gear ratios to assure easy operation with any load, and the operator may hold the body in any position by dropping the dog into engagement with the ratchet on the operating rod.

The bottom of the body 12 is constructed with upwardly inclined side portions 46 (Fig. 4) forming with the ends of the body a water tight pan which prevents the dripping of liquid from garbage or other wet materials being hauled.

The sides of the body are closed by hinged doors 47 extending the full length of the body and manually operable to be opened and closed, and to be sustained in any intermediate position by means hereinafter described. Wedge shaped members 48 (see Fig. 4) fixed to the body bottom and to the cross beams 13 within the angular spaces formed by the inclined sides 46 and beams 13, provide rigid support for the body upon its frame and also support the door hinges. Upon pins 49 extending transversely through each of the members 48 are mounted hinges 50 having bifurcated hook-shaped bearing ends with vertically slotted bearing apertures 51 formed therein and engaging the pins 49 on both sides of the members 48. The upper reaches of the hinges 50 are fixed to and support the doors 47, and permit them to swing outwardly and downwardly by gravity, the pins 49 being positioned inwardly from the edge of the body for that purpose. The slotted bearing apertures 51 permit the doors when being closed to ride over an angular strip 52 secured to the outer edge of the bottom plate at each side of the body and settle by gravity, when completely closed, inside of the apex of the angle to form a tight joint between the bottom of the body and the doors on each side to prevent loose fine material from escaping therethrough.

The operation of the doors is accomplished by cable means mounted independently on each side of the body, and including in each case a supporting bracket 53 (see Figs. 5 and 6) secured on the inner side of the tie beam 14 midway of its length (Fig. 3), as by means of bolts 53ª (Fig. 5). Bearings 54 and 55 are formed in the bracket 53, positioned in transverse relation to the tie beam 14, and carry a shaft 56 journaled therein. A cable drum 57 and a worm gear 58 are fixed on the shaft 56 between its bearings. The bracket 53 is formed with upwardly extending portions 59 at each side of the worm gear, to form with a cap block 60 bearings 61 and 62 in which is journaled the shaft 63 extending parallel to the tie beam 14. A worm 64 is fixed upon the shaft 63 and in operative mesh with the worm gear 58. On each of the ends of the shaft 63, extended without the journals 61 and 62, is mounted a flexible coupling 65 of suitable construction. Operating rods 66 are connected one to each of the couplings 65 and extend longitudinally of the tie beam 14 through suitable bearing supports attached to the cross beams 13, terminating at each end of the body in a bearing bracket 67 mounted on the end cross beams. A detachable hand crank 68 is adapted to be operably connected at the protruding end of either of the rods 66.

A single cable 69 has engagement intermediate its ends with the drum 57 which is arranged to wind and unwind both end portions of the cable by rotating the worm. The end portions lead from the drum to opposite ends of the body 12, each passing over a sheave 70 journaled in a downward extending housing portion 71 formed integrally with the bracket 67, thence upward and over another sheave 72 (Fig. 1) journaled in a suitable bracket 73 mounted on the upper corner of the end member of the body 12, the cable end then being attached within a clamping device 74 mounted on the doors 47 at each upper corner.

The drum 57 is constructed with two offset slots 75 formed in its winding surface, the slots being in opposite sides of the drum and having the displaced portions of the drum wall curved inwardly to form a pair of hook-shaped elements 76. An aperture 77 is formed in the shaft 56 in alinement with the slots 75. The cable 69 passes through the slots 75 and aperture 77 and bears upon the curved elements 76. By this construction the single cable 69 is adapted to be detachably secured to the drum at its center, the formation of the slots permitting the cable to lie smoothly upon the drum, and to be wound in from opposite directions simultaneously. In Figs. 6 and 7, all of the cable 69 is shown paid out as when one of the side doors 47 is open.

For operating the doors an operator attaches the hand crank at the end of either of the operating rods on the side of the body carrying the door to be opened or closed. If the door is closed the cable is unwound by reversely operating the crank whereupon the weight of the door on its inset hinge pivots will carry it outward and downward as the attached cable is paid out. The pitch of the worm thread is such that it locks the worm gear and drum against rotation otherwise than by the worm, and in consequence the door may be lowered and secured in any desired position. The door may be dropped fully down to discharge the load near the truck, or it may be suspended in continuation of the body bottom to act as a chute and carry the load a distance from the truck in its discharge.

An important advantage accrues in this construction of the door operating means in connection with the operation of the body in unloading. Frequently it is desirable to deposit a load in a chute or bin or at some distance from a roadway. The side shift of the body together with the extension of the side doors enables the operator to deposit the load a considerable distance from the truck, and by varying the position of the door that distance may be accommodated to any conditions within its range.

The locking feature of the worm and gear enables the operator to draw the doors snugly closed and secure them in that position.

It will be apparent from the foregoing description that I have provided a dump truck of a new and improved construction which is particularly adapted to efficient and economical use by reason of its durability and strength, and of the convenience and facility with which it may be operated.

While I have herein described the preferred embodiment of my invention with considerable particularity, I would have it understood that I do not thereby intend to limit myself to the form disclosed except as is set out in the appended claims.

I claim as my invention:

1. In a vehicle of the character described, a supporting frame, and a side dumping body thereon arranged to be laterally movable toward either side to dump on either side of the vehicle, a two-way cable winding drum having means forming a partition between the two ways thereof, said partition having an opening therethrough, and a single-length cable attached at opposite ends to opposite sides of the body and lying intermediate its ends in said opening with the two halves of the length thereof arranged to wind oppositely in said ways so that one end is drawn in or paid out as the other end is paid out or drawn in.

2. In a vehicle of the character described, a supporting frame, and a side dumping body arranged to dump on either side of the vehicle, an upright triangular end frame on said supporting frame adjacent the end of said body providing oppositely inclined roller ways on its opposite side edges, roller brackets on said body having rollers engaging on said ways, a sheave bracket on the apex of said end frame carrying a pair of cable sheaves, a cable-winding drum in said end frame having two ways therein and a single length cable having its mid portion passing around said drum, one portion winding in one way oppositely from the other portion winding in the other way so that when one-half of the length of said cable is drawn in upon the other half is paid out, each of said halves of said cable passing over one of said cable sheaves and having permanent connection with one of said roller brackets.

3. In a device of the character described, a supporting frame and a side dumping body arranged to dump on either side of the vehicle, an upright triangular end frame on said supporting frame adjacent the end of said body providing oppositely inclined roller ways on its opposite side edges, roller brackets on said body having rollers engaging on said ways, a sheave bracket on the apex of said end frame carrying a pair of cable sheaves, a cable-winding drum in said end frame having two ways therein, and a single length cable having its mid portion passing around said drum, one portion winding in one way oppositely from the other portion winding in the other way so that when one-half of the length of said cable is drawn in upon the other half is paid out, each of said halves of said cable passing over one of said cable sheaves and having permanent connection with one of said roller brackets, said cable sheaves, roller ways and roller brackets being arranged so that in the operation of said drum the opposite ends of said cable operate substantially endwise of and parallel to the roller ways throughout the movement of said body.

In testimony whereof I have hereunto set my hand.

ADDI BENJAMIN CADMAN.